(12) United States Patent  (10) Patent No.: US 6,415,730 B1
Barker                    (45) Date of Patent:    Jul. 9, 2002

(54) DIMPLED MARINE SEISMIC FAIRING

(75) Inventor: Glen P. Barker, Friendswood, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 09/727,272

(22) Filed: Nov. 29, 2000

(51) Int. Cl.[7] .............................................. F15D 1/10
(52) U.S. Cl. ..................................... 114/243; 114/67 R
(58) Field of Search ................................ 14/243, 67 R; F15D 1/10

(56) References Cited

U.S. PATENT DOCUMENTS 4,404,664 A * 9/1983 Zachariadis ................. 367/19
4,984,218 A * 1/1991 Ritter et al. ................. 367/15
5,171,623 A * 12/1992 Yee .............................. 428/156
5,378,524 A * 1/1995 Blood ......................... 428/141
5,678,504 A * 10/1997 Toplosky et al. ........... 114/243
6,015,420 A * 1/2000 Wulfman et al. ........... 606/168

* cited by examiner

Primary Examiner—Sherman Basinger

(57) ABSTRACT

An apparatus and method for improving the efficiency of marine cable tow operations. Indentations such as dimples in the exterior surface of cable fairings reduce cable strumming and reduce frictional drag forces as the cables and fairings are towed through the water. The size, configuration and orientation of the indentations can be selected to control the desired water flow parameters, and overall tow efficiency is increased.

20 Claims, 2 Drawing Sheets

DIMPLED MARINE SEISMIC FAIRING

BACKGROUND OF THE INVENTION

The present invention relates to the field of marine seismic exploration. More particularly, the invention relates to an improved apparatus and method for improving marine cable tow efficiency by improved fairings attached to a marine cable.

Cables are towed through water in marine seismic operations to pull acoustic energy sources, flotation buoys, hydrophones, and other marine seismic equipment through the water. For large seismic vessels, multiple cables are simultaneously towed in a large swath through the water. The cables may extend thousands of meters behind the seismic tow vessel.

Large drag forces are generated as the cables are towed through the water. The drag forces are caused by friction between the water and cable exterior surface and increase exponentially as the vessel speed increases. Uneven water flow around the cables produces alternating shedding forces which cause transverse vibrations, known as "strumming", in the cables. Strumming creates turbulent flow within the water and generates acoustic noise interfering with seismic data collection operations. Strumming further generates stresses at equipment connection points and accelerates equipment failure.

Numerous techniques have been developed to reduce frictional drag forces acting on a cable towed through water. One technique uses multiple fibers or "hairs" to interrupt vortex shedding and other friction inducing processes. For example, U.S. Pat. No. 4,084,065 to Swenson (1978) disclosed yarn or fiber incorporated into a braided cable for providing a plurality of polyester fiber hairs for reducing low velocity cable strumming in water. U.S. Pat. No. 4,756,270 to Boscov (1988) disclosed cable fairing comprised of fairing hairs formed with a filamentary yarn woven into a cable.

Another technique uses protrusions extending outwardly from the cable to interrupt drag inducing eddies. U.S. Pat. No. 4,190,012 to Rispin et al. (1980) disclosed a cable fairing having a plurality of stubs formed in a spiral pattern about the exterior surface of a cable. U.S. Pat. No. 5,214,244 to Cummings et al. (1993) disclosed a flexible jacket having a helically displaced phase shifter for decoupling a seismic cable from strumming induced by von Karmen vortex sheets. Each of the phase shifting sections had a length less than one quarter the coherence length of the flexible jacket.

Other friction reducing techniques attach fairings to cables to reduce cable strumming in the water. U.S. Pat. No. 4,075,967 to Silvey (1978) disclosed a hydrodynamic fairing having a plurality of parallel vanes. U.S. Pat. No. 4,470,651 to Hale (1987) disclosed a fairing having a relatively large clearance relative to the cable to permit frictionless rocking and consequential wear between the fairing and the cable. U.S. Pat. No. 4,655,155 to Folb et al. (1987) disclosed a faired towline having a rectangular leading edge. U.S. Pat. No. 5,275,120 to Ruffa et al. (1994) disclosed a tow cable fairing having a plurality of radially extending tab members indexed in a helical pattern longitudinally along the cable.

Various fairing configurations have been developed. U.S. Pat. No. 5,335,620 to Small (1993) disclosed a continuous, longitudinally extending fairing comprised of a single plastic extrusion and fastening means for providing shock and impact protection to seismic array sensors and cables. U.S. Pat. No. 5,367,971 to Carpenter et al. (1994) disclosed an outer cable layer having a twisted surface to create ridges for minimizing vortex shedding and cable strumming. U.S. Pat. No. 5,678,504 to Toplosky (1997) disclosed a towing cable fitted with fairings having negative lift vanes.

Improvements to fairings and the connection mechanisms between fairings and cables were shown in U.S. Pat. No. 4,542,708 to Holcombe et al. (1985), which disclosed a fairing cable segment having a rotatable spring steel clip for minimizing interfacial friction between the fairing and cable.

As the size of marine seismic arrays and the tow speed increases, a need exists for improved techniques for reducing drag forces. The techniques should reduce strumming noise interfering with acoustic data collection and should increase tow efficiency through the water.

SUMMARY OF THE INVENTION

The invention provides an apparatus and method for reducing friction acting against a marine cable towable through water. The apparatus comprises a fairing body engagable with the cable, wherein the body has an exterior surface in contact with the water, and a plurality of indentations in the body exterior surface for reducing friction as the body is towed through the water. In different embodiments of the invention, the indentations can comprise dimples, can be symmetrically shaped, can be oriented in a selected pattern, and can have different sizes and configurations.

The method of the invention comprises the steps of attaching a fairing to the cable, wherein the fairing has an exterior surface having a plurality of indentations, of deploying a cable and attached fairing in the water behind a tow vessel, and of moving the tow vessel to tow said cable through the water.

DESCRIPTION OF THE PREFERRED EMBODIMENTS

Figure 1:
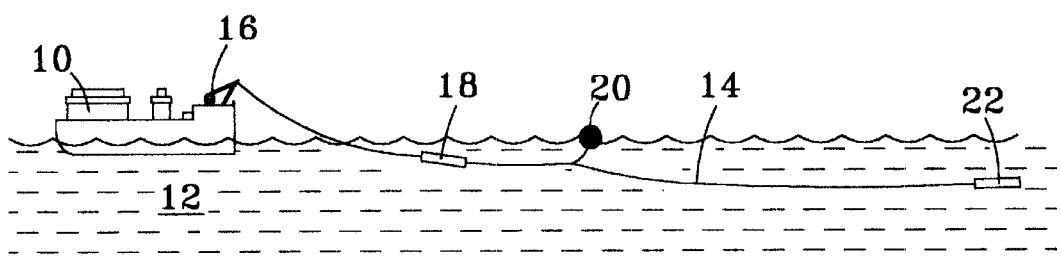
FIG. 1 illustrates a seismic tow vessel in water.

The invention uniquely reduces frictional drag acting against a towed cable and components attached to the cable. Referring to FIG. 1, tow vessel 10 is positioned in water 12 and deploys cable 14 from drum or spool 16. Marine seismic equipment such as acoustic energy source gun 18, buoy 20, and hydrophone 22 is attached to cable 14.

Figure 2:
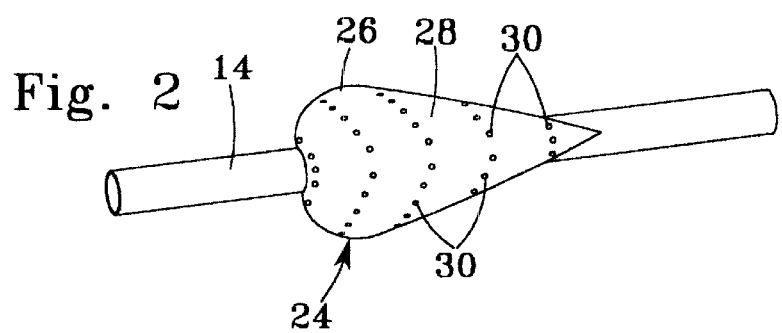
FIG. 2 illustrates indentations formed in the exterior surface of a fairing.

As shown in FIG. 2, fairing 24 generally comprises body 26 and exterior surface 28. Body 26 can be formed with a metallic or extruded or wrapped plastic or composite sheath material resistant to damage. A plurality of indentations 30 are formed in exterior surface 28 for the purposes of reducing drag forces between fairing 24 as cable 14 and fairing 24 are towed through water 12, for reducing the amount of tow energy expended by vessel 10, for reducing strumming of cable 14 and the undesirable noise generated by such strumming, and for reducing the wear on cable 14 at connections between cable 14 and marine seismic equipment such as that identified above.

Figure 3:
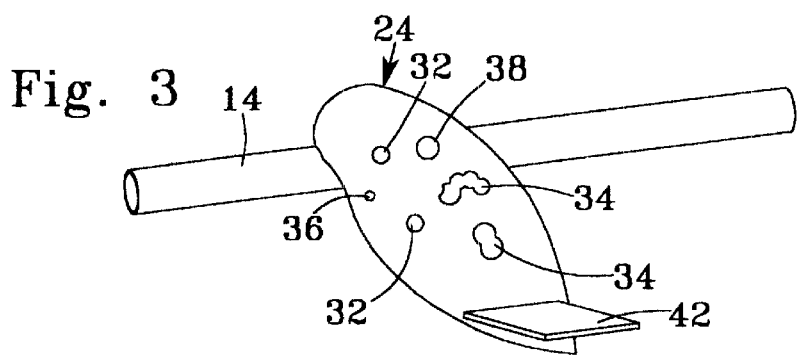
FIG. 3 illustrates different shapes and forms of indentions.

Indentations 30 are formed in the exterior surface 28 in contact with water 12. The term "dimple" as used herein means a slight depression in exterior surface 28, and can be dish-shaped, polygonal, or of another configuration. Each indentation 30 or dimple can be formed with a symmetric or asymmetric configuration as shown in FIG. 3 by symmetric indentation 32 and by asymmetric indentation 34. FIG. 3 also shows geometric indentations 36 and 38 having selected configurations of different shapes, and indentation 30 is formed in a different size. Many different indentation 30 shapes, sizes, and configurations are possible within the scope of the invention, and different combinations of different indentations 30 can be provided to provide different flow dynamics. The size and depth of indentations 30 can be varied to accomplish different flow characteristics. One or more splitter plates 42 can be attached to body 26 to vary the flow dynamics of fairing 24 and cable 14 through water 12.

Figure 4:
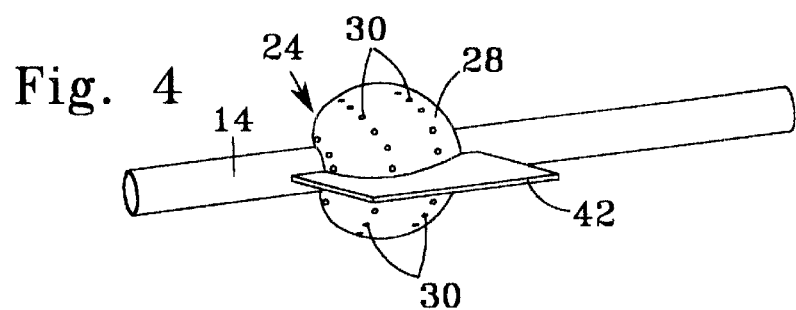
FIG. 4 illustrates one pattern of indentations.

FIG. 4 illustrates a plurality of indentations 30 in a selected pattern. Although one pattern is illustrated in FIG. 4, many different patterns and configurations of indentations 30 are possible to accomplish different flow dynamics between fairing 24 and cable 14 and water 12. A plurality of indentations 30 resist formation of turbulent flow between fairing 24 and water 12 and the correspondent shedding vortexes causing strumming and other undesirable fluid dynamics.

Indentations 30 can be added to sheath exterior surface 28 before or after sheath 26 has been formed. Rollers or other mechanisms can form indentations 30 such as dimples in exterior surface 28. Indentations 30 can also be added to cable 14 to reduce friction and to provide traction against spool 16 or cable pullers for deploying and retrieving cable 14 from water 12 which lessens the radial gripping force necessary to grasp cable 14.

As fairing 24 is pulled through water 12, indentations 30 break up the water flow and reduce strumming of cable 14. Drag forces acting on fairing 24 and cable 14 are accordingly reduced, resulting in less tow energy required to pull fairing 24 and cable 14 and associated seismic equipment through water 12.

Figure 5:
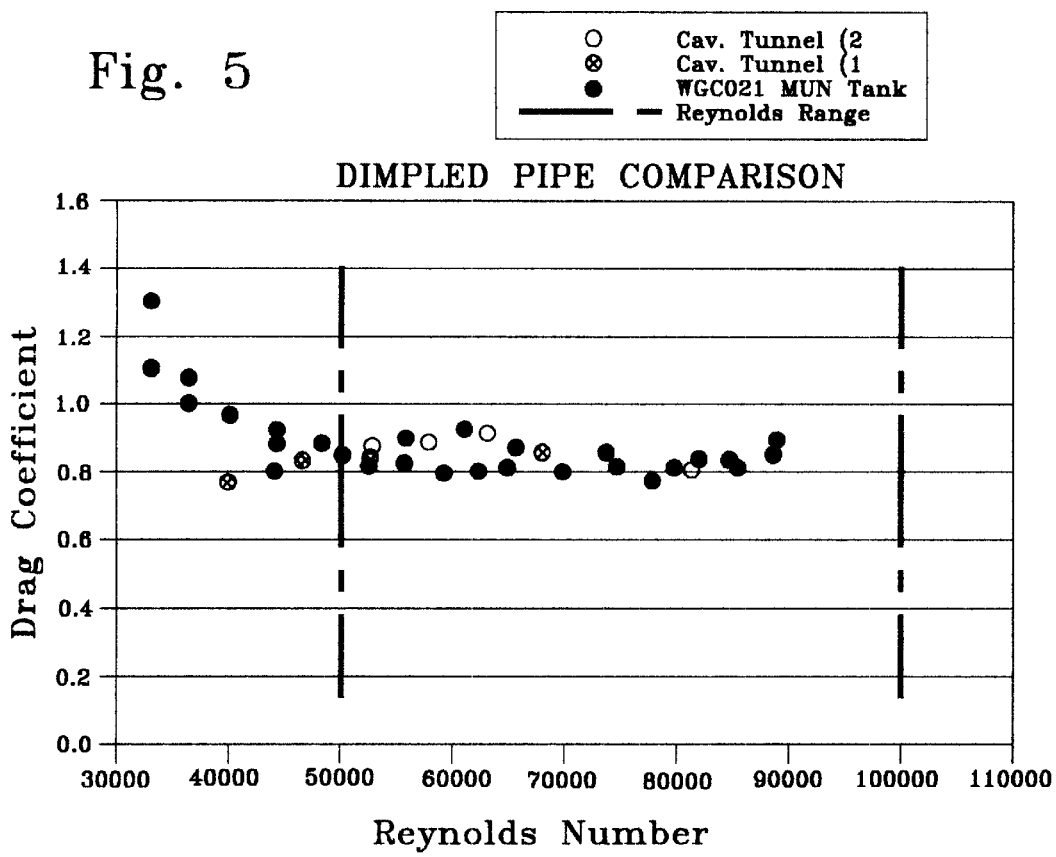
FIG. 5 illustrates test data of a dimpled pipe under different test conditions.
Figure 6:
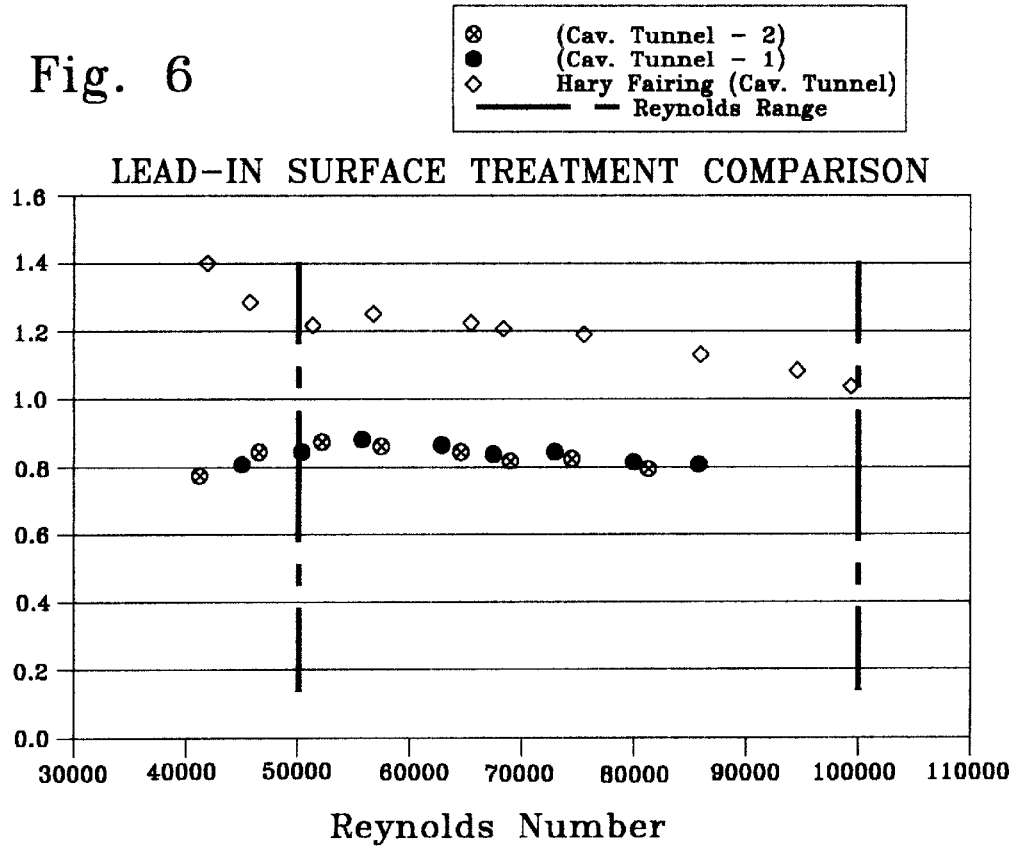
FIG. 6 illustrates test data comparing dimpled pipe to hairy fairings.

FIG. 5 illustrates drag tests under different test conditions. Typical tow ranges for seismic cables range between a Reynolds Number of 50,000 with a 1.45 inch diameter cable at 3.5 knots, and a Reynolds Number of 100,000 with a faired 2.0 inch vane tag line at 4.5 knots. Within this selected Reynolds Number range, which is not limiting to the scope of the invention, different cavitation tunnel and liquid tow tank tests provided substantially similar results for cylindrical cable sections. Larger sized dimples reduce the drag coefficient. FIG. 6 illustrates test results for the invention when compared to a conventional hairy fairing lead. As shown, indentations on exposed surfaces provided superior results in drag reduction.

As previously noted, splitter plate 42 can be attached to fairing 24 to further reduce the drag coefficient. The combination of splitter plate 42 and dimples 30 on cable 14 reduced the drag coefficient to a range between 0.5 and 0.7.

The invention uniquely provides a drag reducing solution not anticipated by conventional systems. Although protrusions and other devices can cooperate with the indentations to accomplish different results, the indentations uniquely provide drag reducing characteristics for marine tow operations.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for reducing friction acting against a marine cable towable through water, comprising:
   a fairing body engagable with the cable, wherein said body has an exterior surface in contact with the water; and
   a plurality of indentations in said body exterior surface for reducing friction as said body is towed through the water.

2. An apparatus as recited in claim 1, wherein said indentations comprise dimples.

3. An apparatus as recited in claim 1, wherein said indentations are symmetrically configured.

4. An apparatus as recited in claim 3, wherein at least one of said indentations is configured in a round dish shape.

5. An apparatus as recited in claim 3, wherein at least one of said indentations is configured in a polygonal shape.

6. An apparatus as recited in claim 3, wherein at least two different shapes of indentations are formed in said body exterior surface.

7. An apparatus as recited in claim 1, wherein said indentations are oriented in a particular pattern on said body exterior surface.

8. An apparatus as recited in claim 1, wherein at least two of said indentations have different sizes.

9. An apparatus as recited in claim 1, further comprising a splitter plate attached to said body.

10. A fairing for reducing drag on a cable towable through water, comprising:
    a body having an exterior surface in contact with the water, wherein said body has a lead end and a tapered second end; and
    a plurality of indentations in said body exterior surface for reducing friction as said body is towed through the water.

11. An apparatus as recited in claim 10, wherein said indentations are symmetrically configured.

12. An apparatus as recited in claim 10, wherein at least two different shapes of indentations are formed in said body exterior surface.

13. An apparatus as recited in claim 10, wherein said indentations are oriented in a particular pattern on said body exterior surface.

14. An apparatus as recited in claim 10, wherein said cable comprises a marine seismic cable.

15. An apparatus as recited in claim 10, further comprising a splitter plate attached to said body.

16. A method for towing a cable in water, comprising the steps of:

attaching a fairing to the cable, wherein said fairing has an exterior surface having a plurality of indentation for reducing friction;

deploying a cable and attached fairing in the water behind a tow vessel; and moving the tow vessel to tow said cable through the water.

17. A method as recited in claim 16, further comprising the step of deploying a fairing in the water wherein at least two of said indentations have different configurations.

18. A method as recited in claim 16, further comprising the step of deploying a fairing in the water wherein at least two of said indentations have different sizes.

19. A method as recited in claim 16, further comprising the steps of attaching a plurality of fairings to the cable.

20. A method as recited in claim 16, further comprising the step of connecting marine seismic equipment to said cable before said cable and fairing are deployed in the water.

* * * * *